US007529890B1

(12) United States Patent
Neuman et al.

(10) Patent No.: US 7,529,890 B1
(45) Date of Patent: May 5, 2009

(54) SYSTEM, APPARATUS AND METHOD FOR FACILITATING ON-CHIP TESTING

(75) Inventors: Paul S. Neuman, Shoreview, MN (US); Lloyd P. Dalton, St. Paul, MN (US)

(73) Assignee: Unisys Corporation, Blue Bell, PA (US)

( * ) Notice: Subject to any disclaimer, the term of this patent is extended or adjusted under 35 U.S.C. 154(b) by 307 days.

(21) Appl. No.: 10/926,258

(22) Filed: Aug. 25, 2004

(51) Int. Cl.
*G06F 12/00* (2006.01)
(52) U.S. Cl. .................. 711/130; 711/141
(58) Field of Classification Search ............ 711/130
See application file for complete search history.

(56) References Cited

U.S. PATENT DOCUMENTS

| | | | | | |
|---|---|---|---|---|---|
| 4,575,792 | A | * | 3/1986 | Keeley | 714/42 |
| 5,513,344 | A | * | 4/1996 | Nakamura | 714/42 |
| 5,831,987 | A | * | 11/1998 | Spilo | 714/719 |
| 5,923,599 | A | * | 7/1999 | Hii et al. | 365/201 |
| 6,415,361 | B1 | * | 7/2002 | Moh et al. | 711/141 |
| 2003/0051197 | A1 | * | 3/2003 | Evans | 714/718 |

OTHER PUBLICATIONS

Sosnowski, J., "'In System' Transparent Autodiagnostics of RAMs", International Test Conference Proceedings, Oct. 1993, IEEE, pp. 835-844.*

* cited by examiner

*Primary Examiner*—Kevin Verbrugge
(74) *Attorney, Agent, or Firm*—Charles A. Johnson; Robert Marley; Hollingsworth & Funk LLC

(57) ABSTRACT

A system, apparatus and method enabling common memory pool tests to be conducted in a multiprocessing system by using substantially the same system components that are used during a normal mode of operation. Under normal mode of operation, a data cache interface facilitates data transfer between processors of a multiprocessor system and the common memory pool. In test mode of operation, an integrated data cache exerciser assumes control of the data cache interface to facilitate test data write and read operations to/from the common memory pool. Test data may be generated from data queues within the multiprocessing system that are also operational during normal mode of operation. Alternatively, the test data may be generated from the address used to access the common memory pool.

14 Claims, 7 Drawing Sheets

SYSTEM, APPARATUS AND METHOD FOR FACILITATING ON-CHIP TESTING

FIELD OF THE INVENTION

The present invention relates in general to a memory test facility, and more particularly, to an on-chip memory test facility that provides built in test functions under operational conditions.

BACKGROUND OF THE INVENTION

Today's computing architectures are designed to provide the sophisticated computer user with increased Reliability, Availability, and Scalability (RAS). To that end, the rise of operating environments, such as the Microsoft Windows NT/2000 operating environments, have presented a relatively low cost solution to the traditional high-end computing environment. The introduction of the Enterprise Edition has extended the scalability and resilience of the NT Server to provide a powerful and attractive solution to today's largest and most mission critical applications.

The Cellular MultiProcessing (CMP) architecture is a software/hardware environment that is developing as the enabling architecture that allows servers such as Windows NT/2000-based servers to perform in such mission critical solutions. The CMP architecture incorporates high performance processors using special hardware and middleware components that build on standard interface components to expand the capabilities of the Microsoft Windows server operating systems. The CMP architecture utilizes a Symmetric MultiProcessor (SMP) design, which employs multiple processors supported by high throughput memory, Input/Output (I/O) systems and supporting hardware elements to bring about the manageability and resilience required for enterprise class servers.

Key to the CMP architecture is its ability to provide multiple, independent partitions, each with their own physical resources and operating system. Partitioning requires the flexibility required to support various application environments with increased control and greater resilience. Multiple server applications can be integrated into a single platform with improved performance, superior integration and lower costs to manage.

The objectives of the CMP architecture are multifold. These objectives may include, for example, providing scaling of applications beyond what is normally possible when running Microsoft Windows server operating systems on an SMP system; improving the performance, reliability and manageability of a multiple application node by consolidating them on a single, multi-partition system; establishing new levels of RAS for open servers in support of mission critical applications; and providing new levels of interoperability between operating systems through advanced, shared memory techniques.

The concept of multiprocessors sharing the workload in a computer relies heavily on shared memory. True SMP requires each processor to have access to the same physical memory, generally through the same system bus. When all processors share a single image of the memory space, that memory is said to be coherent, where data retrieved by each processor from the same memory address is identical. Coherence is threatened, however, by the widespread use of onboard, high speed cache memory. When a processor reads data from a system memory location, it stores that data in high speed cache. A successive read from the same system memory address results instead, in a read from the cache, in order to provide an improvement in access speed. Likewise, writes to the same system memory address results instead to writes to the cache, which ultimately leads to data incoherence between the cache and system memory.

Off-board cache, e.g., fourth level (L4) cache, may also be used in typical SMP designs, whereby multiple processors not only have access to shared system memory, but also to the L4 cache implemented, for example, using Static Random Access Memory (SRAM). Prior art methods of verifying that the SRAM used for L4 cache is operating correctly primarily consists of two methods. A first method involves general purpose SRAM test bed facilities that are implemented external to the system in which the SRAM will be used. Another method includes internal software test facilities executed by one of the processors in the SMP system.

A drawback of the first prior art method of L4 cache verification is that it does not test the SRAM under the same conditions that the SRAM will be used. For example, memory test beds may be implemented whereby different interconnect methods, thermal conditions, timing relationships, and usage patterns are such that adequate performance may be verified while the SRAM is installed in the test bed, but fails while the SRAM is operating under actual usage conditions.

Prior art software facilities, while allowing SRAM tests to be conducted under normal operating conditions, fail to provide adequate flexibility and controllability to the test procedure. Testing SRAM via software requires navigation through multiple layers of software and hardware to perform the tests, which severely limits test control and flexibility. Further, software controlled operation of an SRAM test facility generally requires more time to execute than the hardware controlled counterpart, while also limiting the amount of control that may be exercised over the actual test procedure used for memory verification.

Therefore, a need to facilitate testing of off-board cache memory under normal operating conditions is desirable, while also providing the control, flexibility, and speed of an on-board, hardware based cache memory exerciser. The present invention provides a solution to these and other shortcomings of the prior art, and offers numerous advantages over prior art approaches.

SUMMARY OF THE INVENTION

The present invention is generally directed to a system, apparatus and method that allows common memory pool tests to be conducted in a multiprocessing system by using substantially the same system components that are used during a normal mode of operation.

In accordance with one embodiment of the invention, a method of testing cache memory in a multiprocessor system by receiving a test mode initiation command from the multiprocessor system, terminating a normal mode of operation of the multiprocessor system, and initiating a cache memory test in response to the test mode initiation command. The cache memory test utilizes substantially the same components previously active during the normal mode of operation. The method further comprises returning to the normal mode of operation upon completion of the cache memory test.

In accordance with another embodiment of the invention, a multiprocessor system comprises a plurality of processors sharing a common system bus with access to a common memory pool and a node controller coupled to each of the plurality of processors to facilitate data transfer between the plurality of processors and the common memory pool. The node controller comprises a data interface adapted to conduct data transfer operations during a normal mode of operation of the multiprocessor system and a data exerciser adapted to conduct memory test operations on the common memory pool during a test mode of operation of the multiprocessor system. The test and normal modes of operation are selectable by one of the plurality of multiprocessors.

In accordance with another embodiment of the invention, a data cache exerciser is integrated within a multiprocessor system to conduct common memory pool tests. The data cache exerciser comprises a test manager coupled to receive a test mode initiation command from the multiprocessor system operating in a normal mode of operation. The test mode initiation command terminates the normal mode of operation and transfers the multiprocessor system into a test mode of operation. The data cache exerciser further comprises an address generator coupled to the test manager and adapted to generate a target area defining a test address range in response to the test mode initiation command. Further, the data cache exerciser comprises a mode generator coupled to the test manager and adapted to generate cache test commands to exercise memory locations within an external cache that corresponds to the test address range. Still further, the data cache exerciser comprises a test data controller adapted to receive test data written to and read from the cache to determine error conditions relating to the external cache.

DETAILED DESCRIPTION

The present invention generally provides a dedicated, on-board test facility that may be incorporated within any one of a number of processing arrangements. For illustration purposes, a processing cell, or sub-pod, of an SMP system is used to provide an exemplary environment in which features of the present invention may be used. It should be noted, however, that virtually any processing system having access to off-board cache will benefit from the testing versatility provided by the present invention.

The present invention may be employed within highly scalable computing environments that incorporate numerous processing cells or sub-pods. As discussed in more detail below, each sub-pod may consist of up to eight L4 cache modules, where each L4 cache module may be shared among up to four processors. Many enterprise class computing systems incorporate these sub-pod assemblies within enclosures having limited access capability. As such, once the computing systems have been assembled, it is generally undesirable to disassemble them during trouble shooting activities relating to erroneous conditions for at least two reasons: 1.) disassembly that is required to remove suspect hardware is often placed into test bed environments for further testing, however, failures that owe their existence to the operating environment may not be detected by such a test bed; 2.) disassembly of the limited access enclosure is not a viable solution for routine maintenance. Thus, providing on-board test facilities in accordance with the present invention obviates the need for disassembly entirely, until replacement of a sub-pod assembly has been verified through operation of the present invention.

Figure 1:
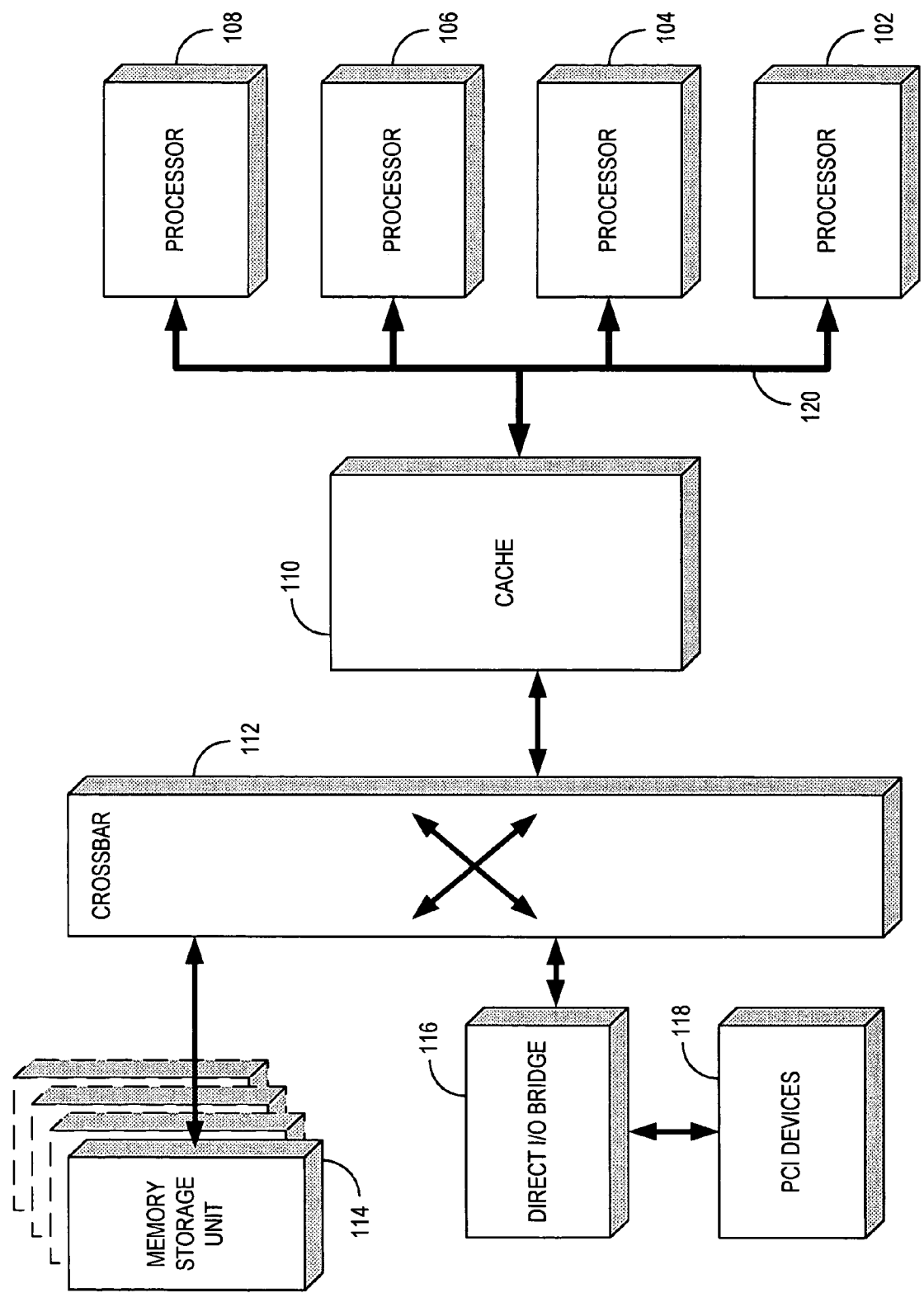
FIG. 1 illustrates a block diagram of a processing cell in accordance with the present invention.

FIG. 1 illustrates an exemplary block diagram of such a processing cell having on-board test facilities in accordance with the present invention. As discussed above, a typical processing cell, or sub-pod, may be comprised of multiple Central Processing Units (CPU) 102-108, hereinafter referred to as processors, and a corresponding Cache 110. The processors may be of the 128 bit McKinley processor family, the 64-bit, IA-64 Itanium family, the 32-bit, Xeon processing family, or any other processor that is compatible within an SMP environment. Each of processors 102-108 share Cache 110 through bus 120, where bus 120 may serve up to, for example, four processors 102-108. Memory Storage Units 114 provide a shared memory pool for processors 102-108 through non-blocking Crossbar 112. Direct IO Bridge 116 provides high-throughput access to Peripheral Component Interconnect (PCI) devices 118. It should be noted that the present invention is not limited for use with only those processors listed above, but may be used with any processor that is compatible within a multi-processing environment.

In one embodiment, Memory Storage Unit 114 may consist of up to four main memory banks each of which may contain a maximum of 16 GigaBytes of Random Access Memory (RAM). Likewise, Cache 110 may comprise up to four banks of cache (not shown), each cache bank may contain up to 32 MegaByte of SRAM, which is on the order of five times faster than Memory Storage Unit 114 RAM. Each cache bank has a dedicated, direct connection to each of Memory Storage Units 114, each direct connection being supported by Crossbar 112. Memory Storage Unit 114 has a typical mainframe design, such that each Memory Storage Unit 114 may handle hundreds of access requests concurrently. Even higher performance may be realized by allowing interleaving between each Memory Storage Unit 114. Interleaving enables data to be spread across all Memory Storage Units 114 for future parallel access by any one or all of processors 102-108 and/or Cache 110. Crossbar 112 allows for fast, consistently low latency, high bandwidth transmissions between Cache 110 and IO bridge 116.

Multiple sub-pods, like the sub-pod illustrated in FIG. 1, may be combined to provide a highly scalable solution for today's demanding enterprise environments, thus increasing the need for on-board test facilities in accordance with the present invention. A single configuration of multiple sub-pods, for example, may include a total of 32 processors, along with eight cache modules, 64 GigaBytes of main memory, four cross-bars and eight direct I/O bridges to support a total of 96 PCI slots. In such a configuration, all eight cache modules may be verified to have proper operating characteristics without having to remove a single piece of hardware. Still further, test routines may be initiated at regular intervals to facilitate routine maintenance functions in accordance with the present invention. One advantageous aspect of the present invention is that the on-board test facilities are incorporated within hardware/software components that are in operation under normal conditions. In order to fully appreciate the integrated nature of the present invention, therefore, exemplary normal modes of operation are explained below in relation to FIGS. 2-3, while exemplary test modes of operation are discussed in relation to FIGS. 4-7.

Figure 2:
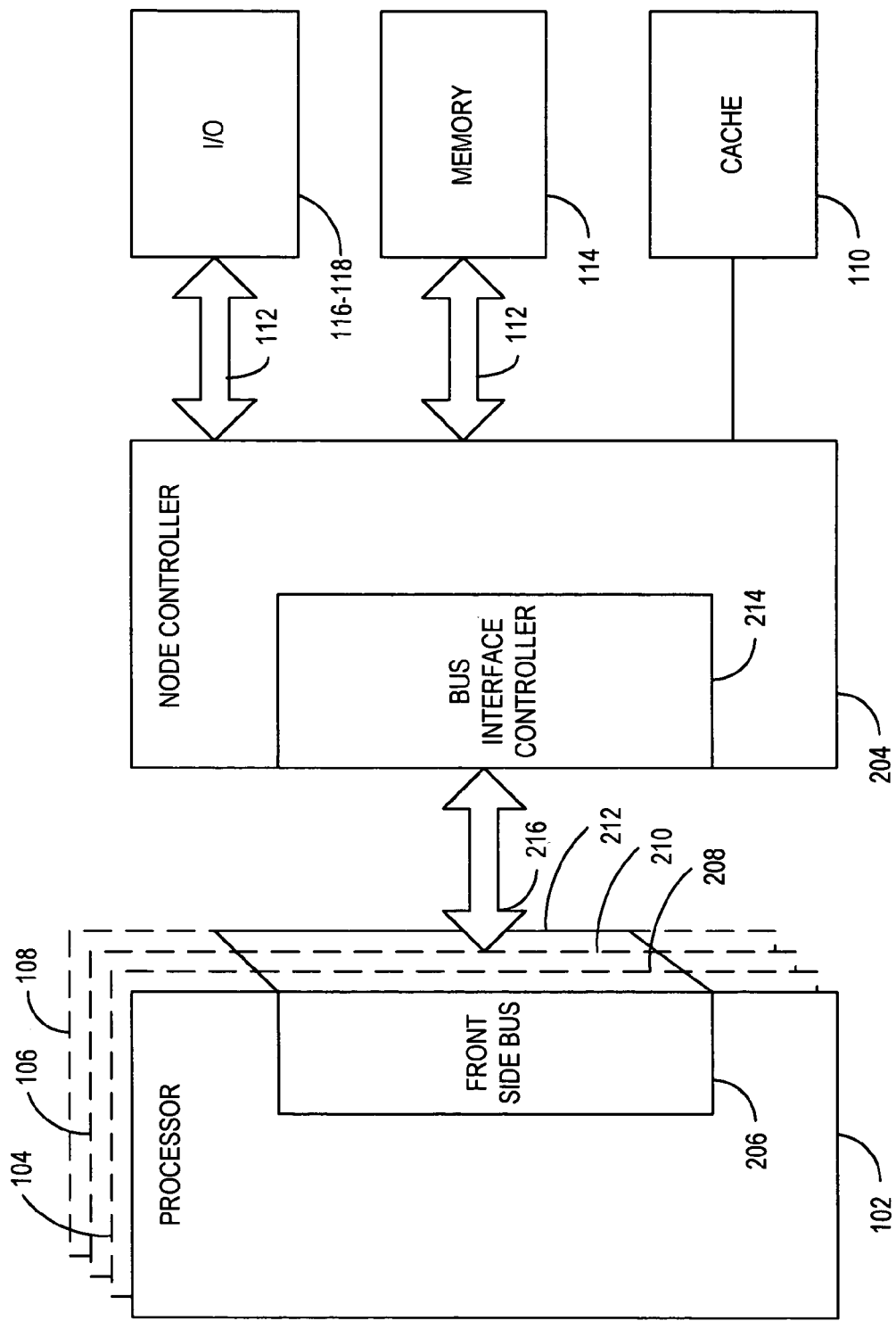
FIG. 2 illustrates a block diagram of the bus interaction of the processing cell of FIG. 1.

FIG. 2 illustrates an exemplary block diagram illustrating bus components, e.g., Front Side Bus 206-212, within Processors 102-108, respectively, and the associated bus controller, e.g., Node Controller 204, required to negotiate bus access by Processors 102-108 to I/O 116-118, Memory 114, and Cache 110. Node Controller 204 provides the processor system Bus Interface Controller 214, a cache controller chip for up to four Processors 102-108 operating on System Bus 216, and a cache exerciser facility used to exercise Cache 110 during built in test mode of Node Controller 204. Node Controller 204 resides on the sub-pod module and is the central agent on the processor system bus to allow interactions between Processors 102-108, Cache 110, Memory 114, and I/O 116-118.

Node Controller 204 facilitates access to Cache 110, by providing quick access to commonly used cache lines that are requested on System Bus 216. The data portion of Cache 110 resides in Static RAM (SRAM) that is external to Node Controller 204 and a corresponding on-chip tag RAM (not shown) keeps track of state and control information for the resident cache lines. In operation, copies of frequently accessed state and control information, i.e., cache blocks or cache lines, are maintained in the SRAM portion of Cache 110. Each cache block or line is marked with a block address, referred to as a tag, so that Cache 110 knows to which part of the SRAM memory space the cache line belongs. The collection of cache tags for each memory block contained within the SRAM is contained within the on-chip tag RAM. Cache 110 is a non-inclusive cache, meaning that not all cache lines resident in the processor's cache (not shown) are necessarily resident within Cache 110.

In operation, Node Controller 204 decodes Front Side Bus 206-212 transactions on System Bus 216 into two main types: 1.) coherent memory requests; and 2.) non-coherent requests. Memory within a multiprocessor system in which every memory read and every memory write is instantly known by each processor within the system is known as coherent memory access. Coherent memory access, therefore, must communicate the memory accessed by one processor to the other processors on the bus through the use of a bus snooping function, so that stale data is not used. Coherent memory requests on System Bus 216 are monitored by the bus snooping function and communicated to all Processors 102-108 on System Bus 216. The non-coherent requests, on the other hand, correspond to requests such as memory-mapped I/O, interrupts, and other special transactions which do not use Cache 110.

Communication between Node Controller 204, I/O 116-118, and Memory Storage Unit 114 is conducted via Crossbar 112. Crossbar 112 is a multi-input, multi-output, non-blocking electronic switch, where access from Node Controller 204 and external components is unimpeded, thus removing any potential bottlenecks.

The number of Processors 102-108 operating in conjunction with Node Controller 204 is advantageously limited in order to avoid excessive bus contention on System Bus 216. Data transfer on System Bus 216 may be implemented on varying width buses to include 32, 64 and 128 bit buses and beyond. The clocking rate on System Bus 216 is usually in the range of several hundred MegaHertz (MHz) and data may be transferred on both the rising and falling edges for double-pumped operation of the system bus clock to achieve an effective System Bus 216 bandwidth of several GigaHertz (GHz). In addition, varying phases of the system bus clock may be used to implement even higher effective bus clock rates, such as providing two rising edges and two falling edges within a clock period for a quad-pumped operation of the system bus clock. Processors 102-108 are responsible for obeying any bus specification that may exist for System Bus 216 between Front Side Bus 206-212 and Bus Interface Controller 214.

Bus Interface Controller 214 interfaces Node Controller 204 to Front Side Bus 206-212 for each of Processors 102-108. Bus Interface Controller 214 provides at least the following functions: 1.) a request queue that allows Node Controller 204 or processors 102-108 to generate bus requests on System Bus 216; 2.) an in-order queue to receive bus requests from Processors 102-108; 3.) a snoop interface to provide address and function information necessary to snoop Node Controller 204 tag RAM and then to provide the tag status to the snoop interface; 4.) response cycle generation to complete bus operations; 5.) generation of deferred phase operations; and 6.) a data transfer interface to provide the control and necessary data queues to transfer data bus reads, writes, interrupts and special transactions.

Figure 3:
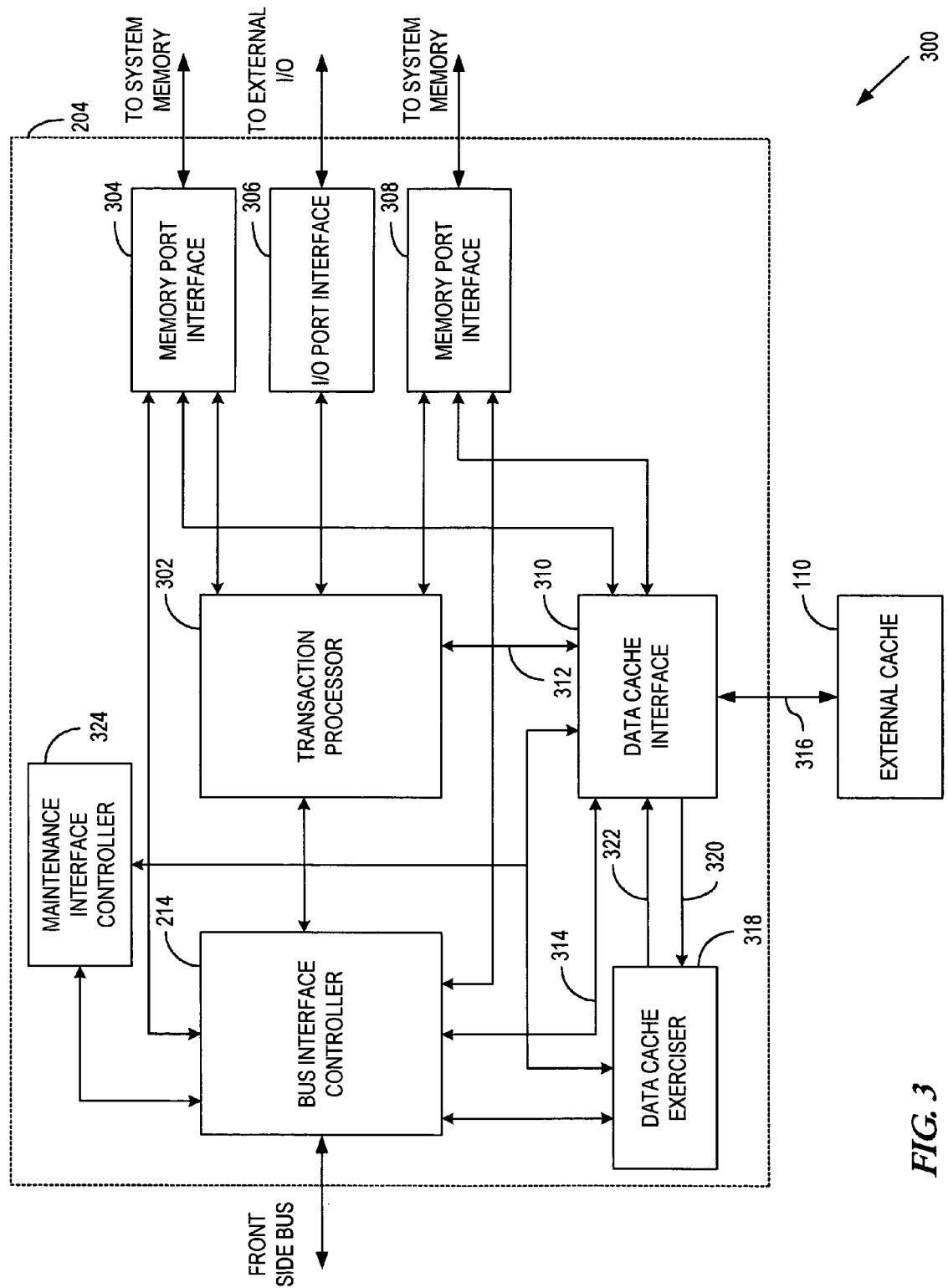
FIG. 3 illustrates an exemplary block diagram of the node controller of FIG. 2.

Block diagram 300 of FIG. 3 illustrates the main portions of Node Controller 204 that provides data I/O and control logic during normal mode and test mode. In normal operational mode, Node Controller 204 provides data I/O and control logic between: Memory Port Interface 304/308 and system memory, e.g., Memory Storage Unit 114 of FIG. 1; I/O Port Interface 306 and external I/O devices, e.g., PCI devices 118 of FIG. 1; and Data Cache Interface 310 and External Cache 110. In normal mode, therefore, Data Cache Interface 310 receives control signals via bus 312 from Transaction Processor 302, while exchanging data with Bus Interface Controller 214 via bus 314 as well as with Memory Port Interface 304 and 308.

In test mode, on the other hand, Data Cache Interface 310 receives control signals from Data Cache Exerciser 318 via bus 322, while exchanging data with Data Cache Interface via bus 320 and data queues (not shown) connected to Memory Port Interface 304/306, to facilitate on-board testing of External Cache 110 in accordance with the present invention. In particular, Bus Interface Controller 214 may receive an external cache test request from Maintenance Interface Controller 324 during normal mode of operation and in response, provide test mode authorization to Data Cache Exerciser 318. In can be seen, therefore, that Node Controller 204 may transition between normal mode and test modes of operation as required, so that testing of External Cache 110 may be facilitated at any time and under normal operating conditions once normal mode operations have completed.

As discussed above, External Cache 110 may be comprised of up to 64 MegaBytes of high speed RAM, e.g., SRAM, which may be broken up into several banks, e.g., a 32 Mega-Byte "even" bank and a 32 MegaByte "odd" bank. In normal mode of operation, data transfer between External Cache 110 and the front side bus is facilitated through Bus Interface Controller 214 and Data Cache Interface 310 via Data Bus 314. The control signals that manage the data transfer between External Cache 110 and the front side bus are generated by Transaction Processor 302 via Control Bus 312.

Node Controller 204 additionally provides all the necessary functions required to facilitate processor bus operations on the front side bus. Generally speaking, Node Controller 204 facilitates at least seven primary functions: 1.) provides an out-going queue (not shown) for outgoing requests to be sent to the front side bus via Bus Interface Controller 214; 2.) provides an in-order queue (not shown) for receiving incoming requests from the front side bus; 3.) provides response control (not shown) for all front side bus requests; 4.) provides a data path for data transfer and control to: system memory, via Memory Port Interfaces 304 and 308; and to External Cache 110, via Cache Bus 316 and Data Cache Interface 310; 5.) provides an I/O interface module to facilitate access to PCI devices; 6.) provides a history stack (not shown) for Bus Interface Controller 214 bus transaction history capture; and 7.) provides error checking (not shown) to collect and check all errors. The other major interfaces accommodated by Node Controller 204 include: the Bus Interface Controller 214 to Transaction Processor 302 interface; data transfer control between Bus Interface Controller 214 and Data Cache Interface 310; and data transfer between Bus Interface Controller 214 and Memory Port Interfaces 304 and 308.

In test mode of operation, Bus Interface Controller 214 relinquishes control of portions of Node Controller 204 to Data Cache Exerciser 318. Control is relinquished to the extent that transfer of test data to and from External Cache 110 is facilitated by Data Cache Exerciser so that proper operation of External Cache 110 may be verified. In one embodiment, the test data may be derived from data previously written to one of many data queues (not shown) that exist within Data Cache Interface 310. In an alternate embodiment, the test data written to External Cache 110 may be derived from the cache address placed onto control bus 322, whereby the data written into a particular address of External Cache 110 is substantially equal to particular replications of the address itself.

In either embodiment, data written, e.g., the write data block, into External Cache 110 may be subsequently read, e.g., the read data block, from External Cache 110 and compared bit by bit to check for equivalence. If the read data block and the write data block are equivalent, then the test for that particular data block is said to have passed and the next data block is likewise tested. Any combination of contiguous or non-contiguous data blocks may be similarly tested so that virtually the entire storage range present within External Cache 110 may be selectively tested while in test mode of operation. Thus, the integrity of External Cache 110 may be verified by a memory exerciser in accordance with the present invention that uses virtually the same operating conditions that External Cache 110 is expected to perform under normal mode of operation.

Figure 4:
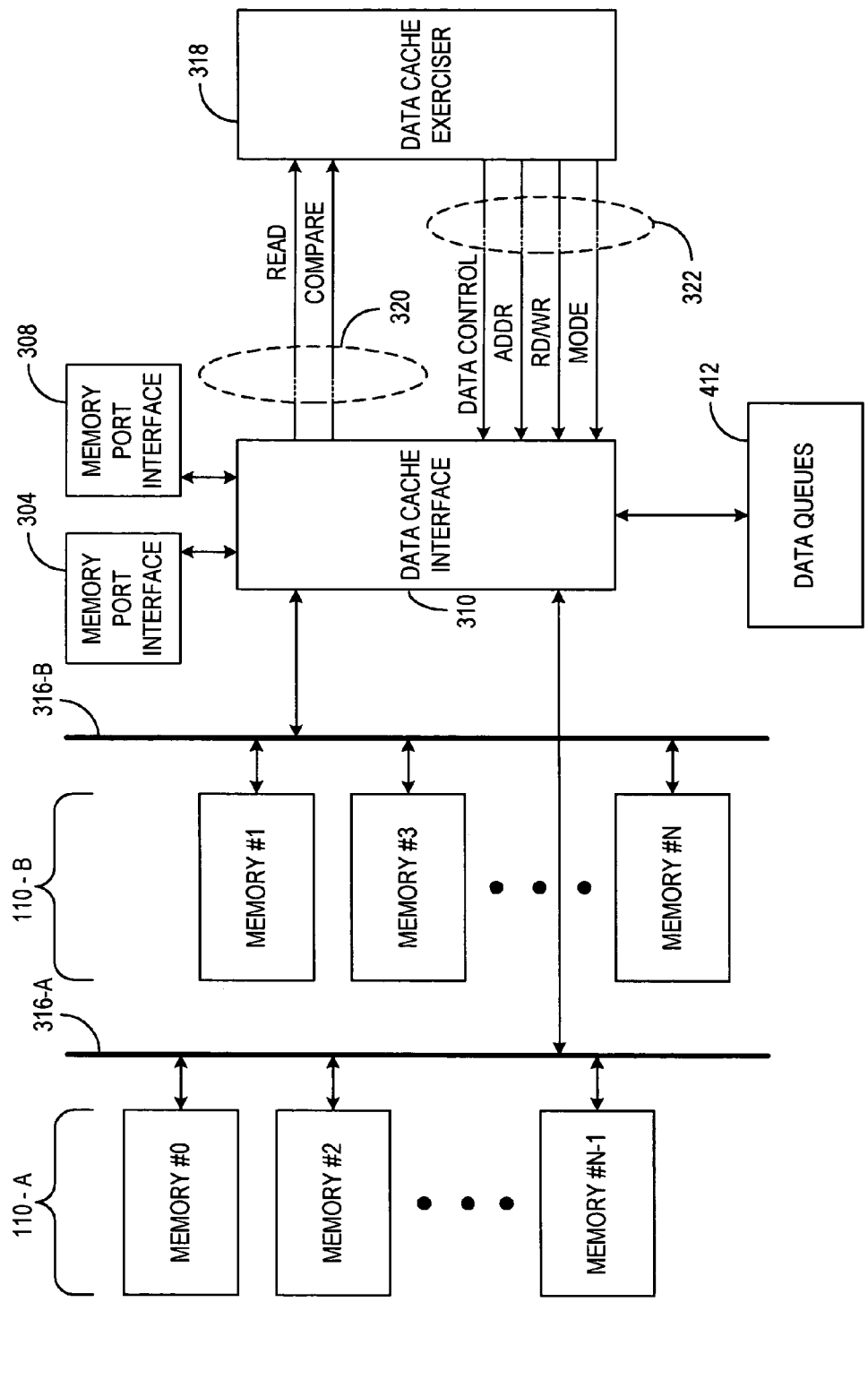
FIG. 4 illustrates an exemplary memory exerciser in accordance with the present invention.

FIG. 4 represents exemplary block diagram 400 of such a memory exerciser in accordance with the present invention. Data Cache Interface 310 and Data Cache Exerciser 318 are exemplified as having "double-wide" data capability, in which "even" and "odd" data blocks of corresponding cache lines are processed between "even" Cache Memory 110-A and "odd" Cache Memory 110-B, via Cache Data Bus 316-A and 316-B, respectively. Each memory bank MEMORY #0, MEMORY #2, etc., of "even" Cache Memory 110-A and each memory bank MEMORY #1, MEMORY #3, etc., of "odd" Cache Memory 110-B may consist of, for example, a 32 MegaByte bank of RAM. In one embodiment, the value of integer N may equal 7, thus providing a total of 8, 32 MegaByte banks of RAM.

A cache line may be defined as a composition of a number of data blocks, whereby each data block may be separately addressed. Thus, for each cache line, there exists a number of address words, each of which is capable of addressing a separate data block within the cache line. Given for example, that a cache line is composed of 128 data bytes, then the cache line contains a total of 1024 bits, provided that each data byte contains 8 data bits. Further, if each data block is defined to contain 128 data bits, then each cache line is comprised of 8, separately addressable blocks of data. Thus, for the first cache line stored within Data Cache 110, a cache line address is used to access the first cache line memory space within MEMORY #0 and MEMORY #1. Next, a cache word address is used as an offset to the cache line address, to separately access each data block within MEMORY #0 and MEMORY #1 that corresponds to the first cache line.

In such an instance, for example, the first data block of the first cache line stored within MEMORY #0 is addressed by the following combination: cache line address=0; cache line word=0. Likewise, the last data block of the same cache line is stored within MEMORY #1 and it is addressed by the following combination: cache line address=0; cache line word=7. Thus, each even numbered data block of the first cache line, e.g., 0, 2, 4, and 6, is accessed from MEMORY #0 and each odd numbered data block of the first cache line, e.g., 1, 3, 5, and 7, is accessed from MEMORY #1. All remaining cache lines existent within External Cache 110 are accessed in a similar manner. Given that each cache line's storage capacity is, for example, 1024 bits, and that External Cache 110 has a capacity of 32 MegaBytes, then a total of 32000 cache line addresses are required to individually address each cache line resident within External Cache 110, which requires 15 address bits. An additional 3 bits is required to address each individual cache line word within each cache line address. Thus, an 18 bit address bus, e.g., 316-A and 316-B, is required to fully address the complete memory space represented by External Cache 110.

In one embodiment during test mode, test data written into External Cache 110 is retrieved from Data Queues 412, whereby Data Queues 412 represents any one or all of a number of data queues existent within Node Controller 204. Data queues (not shown), for example, exist for each of Memory Port Interface 304 and Memory Port Interface 308, while a third input data queue (not shown) exists within Bus Interface Controller 214. Thus, test data that is written to External Cache 110 may ultimately be derived from Memory 114 via Memory Port Interfaces 304 and/or 308, via the Front Side Bus from one of Processors 102-108, or from data stored within the data queues. Likewise, test data read from External Cache 110 may be stored within Data Queues 412, or within Data Cache Exerciser 318.

Memory Exerciser 400 generally operates in one of two test modes: data mode; and address mode. In data mode, Memory Exerciser 400 loops through a programmable cache line address range and corresponding cache word address range of the target memory, whereby the target memory represents the particular memory space within External Cache 110 that is under test. As discussed above, data written into External Cache 110 may be extracted from on board Data Queues 412, from Data Cache Interface 310, or from Memory 114 via Memory Port Interfaces 304 and/or 308.

In address mode, the test data written to External Cache 110 is not generated from any of the above mentioned data stores, but rather is generated using the address used to access External Cache 110. In other words, if a particular cache line under test is located at address 0x00000h, i.e., the 18-bit, hexadecimal representation of the cache line resident at Cache Line Address 0/Cache Line Word 0 (CLA 0/CLW 0), then the data written to the least significant 18 bits of the cache line is all logic zero values. Likewise, the next most significant 108 bits of the cache line at CLA 0/CLW 0 is written as 6 replications of 18 bit, logic zero values. Finally, the remaining 2 most significant bits of the cache line is written as the CLW 0 value, e.g., 0. Address test mode is discussed in more detail below in relation to FIGS. 6 and 7.

It should be noted that block diagram 300 of FIG. 3 illustrates an implementation of Node Controller 204 having both operational mode and test mode capability, whereby Data Cache Exerciser 318 transitions from an idle mode during normal operation of Node Controller 204, to test mode during test operation of Node Controller 204, as directed by Maintenance Interface Controller 324. Once in test mode, Data Cache Exerciser 318 assumes supervisory control over Bus Interface Controller 214 and Data Cache Interface 310 in support of the test mode in accordance with the present invention. Thus, the test mode utilizes components of the operational system to conduct testing of External Cache 110 under normal operating conditions. In such an instance, conditions during integrated testing of External Cache 110 are substantially identical to conditions that are present during normal operational mode. Thus, the potentially erroneous test results that may be caused by various interconnect methods, thermal conditions, timing relationships, and usage patterns concomitant with the use of external test beds are mitigated through the use of the present invention.

Further, by providing direct memory access to Data Cache Exerciser 318 during test mode, the amount of time required to complete the memory test is substantially decreased, as compared to the amount of test time required by conventional software based techniques. Still further, direct control of the memory test by Data Cache Exerciser 318 insures an increased amount of flexibility and controllability of the memory test as discussed more fully below.

Test mode may be initiated via Maintenance Interface Controller 324. The corresponding test mode parameters may be downloaded to Data Cache Exerciser 318 during this test initiation. The actual test data used during data mode may be downloaded to the Data Cache Interface 310 data queues via Maintenance Interface Controller 324 during test initiation. These are the same data queues that cache write data coming from the front side bus or memory interfaces use in normal mode.

Data read from the target area of External Cache 110 during test mode is delivered to Data Cache Exerciser 318 via data bus READ, whereas the test data used to write the target area within External Cache 110 is delivered to Data Cache Exerciser 318 via data bus COMPARE. Thus, separately addressable data blocks under test within External Cache 110, as represented by signal READ, may be tested for proper operation by comparison to the test data blocks, e.g., as represented by signal COMPARE. In one embodiment, each target area data block may represent 128 bits of data, whereby a bit by bit comparison of signal READ and signal COMPARE is performed by Data Cache Exerciser 318 during test mode of operation. Any discrepancies found during the comparison may subsequently be reported to Maintenance Interface Controller 324 for error handling purposes that are beyond the scope of the present invention. It should be noted, however, that the comparison during test mode of operation is performed using substantially the same components as are used in their normal mode of operation as discussed below in relation to FIG. 5.

Figure 5:
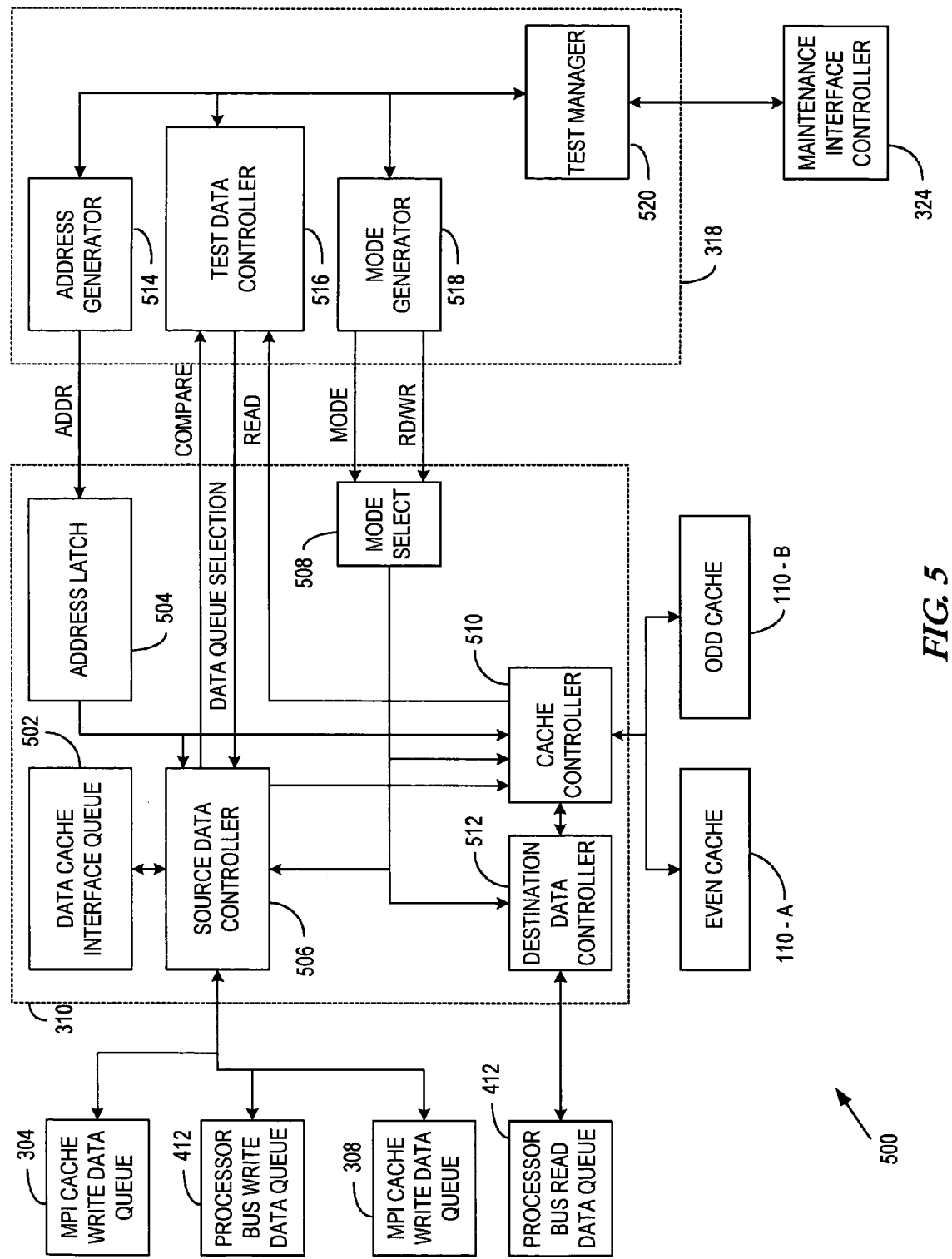
FIG. 5 illustrates an exemplary test configuration in accordance with the present invention.

Test Configuration 500 of FIG. 5 illustrates an exemplary configuration in accordance with the present invention, whereby each component of FIG. 5 (excluding Data Cache Exerciser 318 and Maintenance Interface Controller 324) is active during normal mode of operation as discussed above in relation to FIGS. 1-3. Data Cache Exerciser 318 is activated once Test Manager 520 has received test mode instructions from Maintenance Interface Controller 324. The test mode instructions sent by Maintenance Interface Controller 324 may include, but are not limited to, the following instruction set: test mode of operation (e.g., data mode or address mode); test data (e.g., either the actual test data, or the address location(s) of the test data available from Memory Port Interfaces 304 and/or 308, Process Bus Write Data Queue 412, or Data Cache Interface Queue 502); and the target area within Even Cache 110-A and Odd Cache 110-B to be tested.

In test mode of operation, Mode Select 508 receives signals MODE and RD/WR from Mode Generator 518 in response to receiving test mode instructions from Maintenance Interface Controller 324. Signal MODE determines which test mode, e.g., data or address, that Test Configuration 500 is operating under and signal RD/WR determines whether data is being written into or read from External Cache 110. When operating under the address mode during a write pass, for example, the target area received from Test Manager 520 is converted into a real address space by Address Generator 514. In particular, the real address space defines a set of 18 bit address locations (as discussed above) that define the target area within Even Cache 110-A and Odd Cache 110-B to be tested. Each 18 bit address is then provided to Cache Controller 510 as required during each write operation to External Cache 110. In addition, Source Data Controller 506 converts each 18 bit real address into the corresponding 128 bit test data block (as discussed in more detail below) for subsequent transfer to Cache Controller 510. As each address/test data block pair is generated, Cache Controller 510 provides the appropriate control necessary to effect a write to Even Cache 110-A and Odd CACHE 110-B.

Once the target area under test has been written with test data, signal RD/WR indicates that data from External Cache 110 is to be read by Cache Controller 510 at the address indicated by Address Latch 504, and subsequently placed onto data bus READ. The corresponding test data that was used to write the target area under test, is then placed onto data bus COMPARE by Source Data Controller 506 and compared by Test Data Controller 516. Any bit discrepancies found between the data blocks represented on data bus READ and data bus COMPARE are then reported to Test Manager 520. It should be noted, that the target area under test may be of any size, from a minimum target area of one data block, e.g., 128 bits, to a maximum target area equal to the memory capacity of External Cache 110.

In data mode of operation, on the other hand, any one of a number of source data locations may be used to generate the test data as determined by signal MODE. Signal MODE may indicate, for example, that the test data is to be provided by Test Data Controller via bus DATA QUEUE SELECTION, such as would be the case when test data is received directly from Processors 102-108. Conversely, signal MODE may indicate that the test data is to be provided by Data Cache Interface Queue 502, the Processor Bus Write Data Queue 412, Memory Port Interface Cache Write Data Queue 304, or Memory Port Interface Cache Write Data Queue 308. In such instances, the test data may have been previously determined and pre-loaded during initiation of Test Configuration 500.

It should be noted that Process Bus Read Data Queue 412 may be used by Destination Data Controller 512 to temporarily store test data that was read from External Cache 110. In such an instance, the entire target area may be written, and subsequently read, prior to placing any data onto data bus READ or onto data bus COMPARE. Accordingly, once Test Data Controller 516 is ready to receive the results of the completed memory test, then data from Process Bus Read Data Queue 412 may be used by Destination Data Controller 512 to drive bus READ, while data from any one of the data source devices used to generate the test data may be used by Source Data Controller 506 to drive data bus COMPARE.

Figure 6:
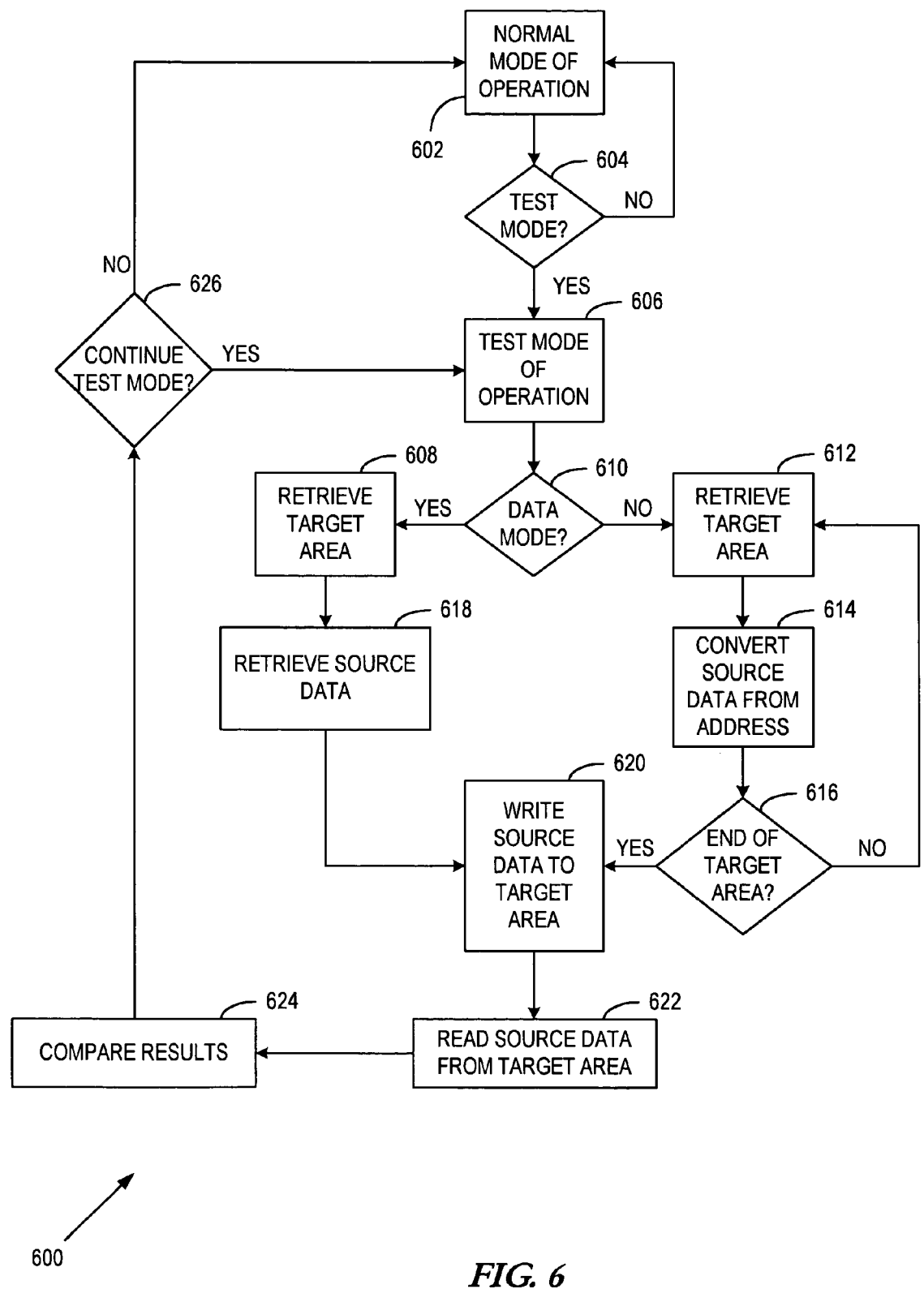
FIG. 6 illustrates an exemplary flow diagram in accordance with the present invention.
Figure 7:
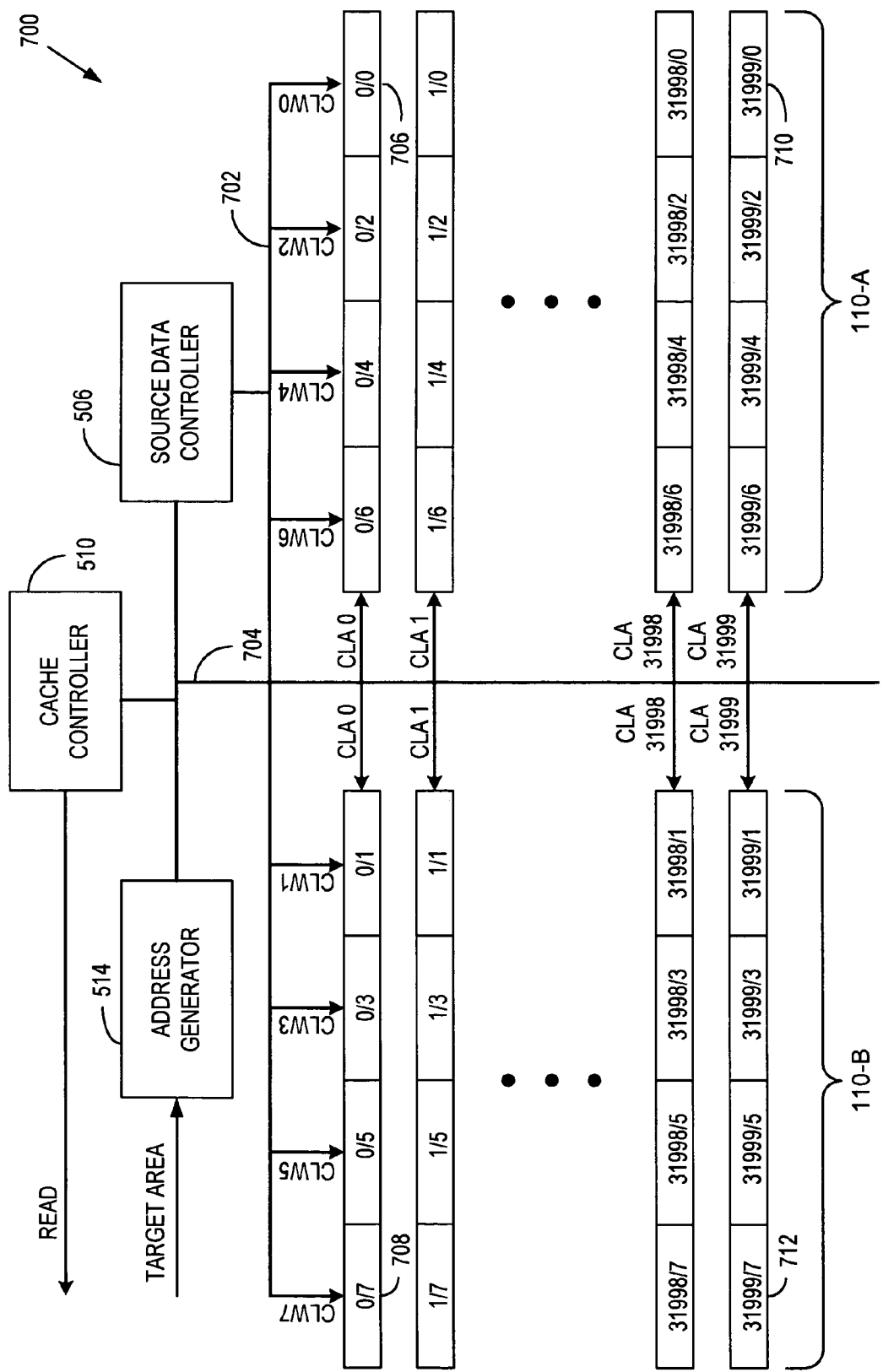
FIG. 7 illustrates an exemplary diagram of a memory under test in accordance with the present invention.

In order to illustrate an exemplary operation of Test Configuration 500, flow diagram 600 of FIG. 6 is now discussed in conjunction with memory diagram 700 of FIG. 7, whereby a cache line address range of 0x00000h, i.e., hexadecimal representation of address 0, to 0x7cffh, i.e., hexadecimal representation of address 31999, has been designated as the target area to be tested via signal TARGET AREA. A maintenance processor (not shown) is the requesting device, whereby a test of the target area within External Cache 110 is requested. It should be noted that the relative cache address test range specified via signal TARGET AREA is converted by Address Generator 514 into an absolute address test range for External Cache 110. In such an instance, the absolute address test range exists within the actual address space of External Cache 110, e.g., as accessed by bus 702 and 704 of FIG. 7.

Step 602 designates that the normal mode of operation of Node Controller 204 is active, whereby normal bus operations between Processors 102-108, Memory Storage Unit 114, PCI devices 118, and Cache 110 is in place as discussed above in relation to FIGS. 1-3. The maintenance processor may issue a test mode command, whereby test mode may be initiated in steps 604 and 606. Further, the test mode type, e.g., data or address, may be designated by the maintenance processor as in step 610. If data mode is selected, then the target area to be tested, e.g., TARGET AREA, is retrieved in step 608 and the corresponding source data is retrieved in step 618 from the corresponding source data contributors, e.g., Memory Port Interface 304 and/or 308, Read Data Queue 412, Data Cache Interface Queue 502, or Test Data Controller 516 via Source Data Controller 506 and then written to the target area as in step 620.

If, on the other hand, address mode is required, then step 612 is executed, whereby the target area to be tested, e.g., TARGET AREA, is retrieved from Test Manager 520. Address Generator 514 then converts the TARGET AREA from a relative address range to an absolute address range. Source Data Controller 506 then receives each converted address within the absolute address range and calculates the source data to be used during the cache test from the absolute address range as in step 614.

Memory diagram 700 illustrates an exemplary test configuration, in which the entire memory space associated with External Cache 110 is under test. In one embodiment, External Cache 110-A and 110-B combine to provide storage for a total of 32000 cache lines, whereby the first absolute cache line address relating to the TARGET AREA is 0x00000h. Thus, cache line address, e.g., CLA 0, is used to address the "even" data blocks in Even Cache 110-A and the "odd" data blocks in Odd Cache 110-B. Likewise, each subsequent cache line is accessed by its corresponding cache line address, e.g., CLA 1, CLA 2, etc., in similar fashion.

Each cache line address represents the base address for each cache line, whereas each cache line word, e.g., CLW 0-CLW 7, is used as an offset to the cache line address. Each cache line word provides individual access to each 128 bit data block within each cache line. The combination of the cache line address with the cache line word is used by Source Data Controller 506 to generate the test data to be written into each cache line. In data blocks 706-712, the decimal equivalent of the 18 bit CLA/CLW combination is displayed. Thus, for data block 706, for example, the decimal value of the cache line address, e.g., CLA 0, is 0, as is the decimal value of the cache line word, e.g., CLW 0. Hence, the least significant 3 bits of data block 706 reflect the CLW 0 value, e.g., decimal 0, while the next 15 least significant bits reflect the CLA 0 value, e.g., decimal 0. The decimal value of 0 is then replicated to fill out the remaining 110 bits of data block 706.

Similarly for data block 712, the decimal value of the cache line address, e.g., CLA 31999, is equal to 63999. Further, the decimal value of the cache line word, e.g., CLW 7, is equal to 7. Hence, the decimal value of 7 is written into the least significant 3 bits of data block 712, while the decimal value of 31999 is then written into the next 15 least significant bits. Then, the 31999/7 decimal combination is replicated to fill out the remaining 110 bits of data block 712.

Once the TARGET AREA has been written with the proper test data, Cache Controller 510 then reads back the test data and supplies the data on data bus READ as in step 622. The corresponding source test data is then supplied on data bus COMPARE by Source Data Controller 506, whereby a bit for bit comparison is performed as in step 624. Any discrepancies in bit comparisons are then reported as necessary. The continuation of test mode is then verified in step 626 and either continues as in step 606, or terminates into normal mode of operation as in step 602.

It should be noted, that the number of data blocks written into the target area prior to reading any of the data blocks is fully variable. For example, data block 706 may be written with test data and immediately read by Cache Controller 510 for ultimate verification by Test Data Controller 516. Alternatively, one complete cache line, e.g., data blocks 706-708, may be written before cache line 0 is read back again for verification. Still further, the complete address space of External Cache 110, e.g., data block 706-712, may be written before being read back again for verification.

Other embodiments of data mode contemplate virtually any test data pattern that may be supported by Memory Port Interface 304 and 308, Read Data Queue 412, Data Cache Interface Queue 502, or Test Data Controller 516. In one embodiment, for example, a test data pattern of alternating logical 1's and logical 0's is effective to determine whether adjacent data lines of a data bus are shorted together.

In conclusion, exemplary systems, apparatuses and methods have been presented that allow SRAM or other memory used in external cache applications to be tested under substantially the same operating conditions that the SRAM/memory will be used. Thus, the SRAMs may be installed, tested, and immediately used in operational mode if verified without the impeded access that often encumbers software test methods. Still further, greater flexibility in testing modes is offered by the dedicated data cache exerciser of the present invention, such that for example, routine maintenance operations may be performed to automatically verify proper operation at regular intervals.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of testing cache memory in a multiprocessor system, the method comprising:
   receiving a test mode initiation command from the multiprocessor system during a normal mode of operation of the multiprocessor system;
   terminating the normal mode of operation of the multiprocessor system and initiating a cache memory test of cache memory in response to the test mode initiation command;
   in response to initiating the cache memory test, suspending data transactions between a front side bus and the cache memory, and logically coupling a data cache exerciser to substantially the same components previously active during the normal mode of operation to perform the cache memory test; and returning to the normal mode of operation, logically decoupling the data cache exerciser, and returning to the data transactions between the front side bus and the cache memory upon completion of the cache memory test.

2. The method according to claim 1, wherein the test mode initiation command includes a target area defining a relative cache address range to be tested.

3. The method according to claim 2, wherein the relative address range is converted to an absolute address range relating to physical memory locations within the cache to be tested.

4. The method according to claim 3, wherein external data is written to the physical memory locations.

5. The method according to claim 4, wherein the external data is retrieved from any one of a plurality of data queues within the multiprocessor system that are active during the normal mode of operation.

6. The method according to claim 4, wherein a data cache interface normally used in the normal mode of operation is used to write the external data.

7. The method according to claim 3, wherein data used to write into the cache at locations corresponding to the absolute address range is generated from address values associated with the absolute address range.

8. A multiprocessor system, comprising:
a plurality of processors sharing a common system bus with access to a common memory pool; and
a node controller coupled to each of the plurality of processors to facilitate data transfer between the plurality of processors and the common memory pool, the node controller comprising:
a bus interface adapted to conduct data transfer operations with a front side bus during a normal mode of operation of the multiprocessor system;
a memory interface coupling the bus interface to the memory pool;
a data exerciser adapted to conduct memory test operations on the common memory pool during a test mode of operation of the multiprocessor system, wherein the test and normal modes of operation are selectable by the multiprocessor system;
wherein the data exerciser comprises a test manager coupled to receive a test mode initiation command from the multiprocessor system while the multiprocessor system is operating in the normal mode of operation, and wherein the test mode initiation command terminates the normal mode of operation, transfers the multiprocessor system into a test mode of operation, suspends data transactions involving the bus interface and logically couples the data exerciser to the common memory pool via the memory interface during the test mode of operation.

9. The multiprocessor system according to claim 8, wherein the data exerciser further comprises an address generator coupled to the test manager and adapted to generate a target area defining a test address range within the common memory pool in response to the test mode initiation command.

10. The multiprocessor system according to claim 9, wherein the data exerciser further comprises a mode generator coupled to the test manager and adapted to generate cache test commands to exercise memory locations within the common memory pool that correspond to the test address range.

11. The multiprocessor system according to claim 10, wherein the data exerciser further comprises a test data controller adapted to receive test data written to and read from the common memory pool to determine error conditions relating to the common memory pool.

12. The multiprocessor system according to claim 11, wherein the node controller further comprises a plurality of data queues adapted to store the test data written to the common memory pool while in the test mode of operation and adapted to store operational data while in the normal mode of operation.

13. The multiprocessor system according to claim 12, wherein the plurality of data queues are further adapted to store the test data read from the common memory pool while in the test mode of operation.

14. A system comprising:
a plurality of processors sharing a common system bus with access to an external cache; and
a node controller coupled to each of the plurality of processors to facilitate data transfer between the plurality of processors and the external cache, the node controller comprising a bus interface adapted to conduct data transfer operations with a front side bus during a normal mode of operation of the multiprocessor system, a memory interface coupling the bus interface to the external cache, and a data cache exerciser comprising:
a test manager coupled to receive a test mode initiation command from the multiprocessor system operating in a normal mode of operation, wherein the test mode initiation command terminates the normal mode of operation, transfers the multiprocessor system into a test mode of operation, suspends data transactions involving the bus interface, and logically couples the data cache exerciser to the external cache via the memory interface during the test mode of operation;
an address generator coupled to the test manager and adapted to generate a target area defining a test address range in response to the test mode initiation command;
a mode generator coupled to the test manager and adapted to generate cache test commands to exercise memory locations within the external cache that corresponds to the test address range; and
a test data controller adapted to receive test data written to and read from the external cache to determine error conditions relating to the external cache.

* * * * *